United States Patent
Monpetit et al.

[15] 3,665,901
[45] May 30, 1972

[54] SYSTEM CONTROLLING THE SPEEDY ENERGIZATION OF ELECTROMAGNETS, CHIEFLY THOSE CONTROLLING THE OPENING OF ELECTROMAGNETIC INJECTORS IN INTERNAL COMBUSTION ENGINES

[72] Inventors: Louis A. Monpetit, L'Etang-la-Ville; Pierre M. Advenier, Paris, both of France

[73] Assignee: Societe des Procedes Modernes d'Injection Sopromi, Les Mureaux, France

[22] Filed: Dec. 23, 1969

[21] Appl. No.: 887,487

[30] Foreign Application Priority Data

| Dec. 27, 1968 | France | 181114 |
| Apr. 18, 1969 | France | 6912153 |
| June 13, 1969 | France | 6919657 |
| Aug. 14, 1969 | France | 6928097 |

[52] U.S. Cl..........................123/32 EA, 315/356, 317/131, 317/139, 317/148
[51] Int. Cl. .....................................F02b 3/00, H01h 47/24
[58] Field of Search..................123/32; 315/356, 350, 355; 317/DIG. 6, 131, 139, 148

[56] References Cited

UNITED STATES PATENTS

| 2,920,195 | 1/1960 | Haugen | 123/32 |
| 3,056,906 | 10/1962 | Peters | 317/151 |
| 3,072,045 | 1/1963 | Goin | 317/151 |
| 3,433,207 | 3/1969 | Bassot et al. | 123/32 |
| 3,456,628 | 7/1969 | Bassot et al. | 123/32 |
| 3,465,730 | 9/1969 | Bassot et al. | 123/32 |
| 3,465,731 | 9/1969 | Bassot et al. | 123/32 |
| 3,490,425 | 1/1970 | Bassot et al. | 123/32 |

FOREIGN PATENTS OR APPLICATIONS

| 954,627 | 12/1956 | Germany | 315/355 |

Primary Examiner—Laurence M. Goodridge
Assistant Examiner—Ronald B. Cox
Attorney—Kenyon & Kenyon Reilly Carr & Chapin

[57] ABSTRACT

System controlling the speedy energization of electromagnets, chiefly those controlling the opening of electromagnetic injectors in internal combustion engines.

An arrangement intended chiefly for the energization of electromagnetic solenoids for operating fuel injectors of internal combustion engines wherein the means for energizing the electromagnetic solenoids in the desired sequence receive control signals periodically and at the same frequency as an induction coil fed by the same power supply as said solenoids. The magnetic energy generated in the solenoids and in the induction coil upon termination of the control signals is stored in means such as one or more condensers so as to be recovered for rapidly energizing the proper electromagnetic solenoid for the next injector operation.

22 Claims, 11 Drawing Figures

Patented May 30, 1972 3,665,901

INVENTORS
LOUIS MONPETIT
PIERRE ADVENIER
BY
Kenyon & Kenyon
ATTORNEYS

SYSTEM CONTROLLING THE SPEEDY ENERGIZATION OF ELECTROMAGNETS, CHIEFLY THOSE CONTROLLING THE OPENING OF ELECTROMAGNETIC INJECTORS IN INTERNAL COMBUSTION ENGINES

The present invention has for an object the provision of improved means for speedily energizing electromagnets, and in particular, those controlling the opening of electromagnetic fuel injectors incorporated in internal combustion engines. In U.S. Pat. No. 3,456,628, assigned to the assignee of the present application, there is described a circuit wherein the magnetic energy produced in the solenoid at the moment at which the current therein is cut off, is stored in a condenser and recovered at the moment of the following injection in order to obtain a rapid opening of the injector as a result of the discharge of said condenser, the injector remaining open during a predetermined period of time by means of a weak current fed by a voltage supply. To this end the above prior patent discloses an oscillating circuit including the injector-controlling solenoid and a condenser connected in parallel with the circuit feeding said solenoid. Through a suitable connection of a diode and of thyristors, it was possible to recover the magnetic energy acting on the injectors in the condenser which was thus charged by a high voltage of a magnitude of 60 to 70 volts at the moment of the sudden cut-off of the maintenance current. The condenser retained its charge for one-quarter of the oscillation period of the oscillating circuit and then discharged into the injector solenoids in the sequence desired for the injections. Thus the injector opened very rapidly and remained open under the action of a maintenance current the duration of which was adjusted as a function of the operative parameters of the engine.

It was found that the amount of energy which could thus be recovered was of a magnitude of only 60 to 70 percent of the energy remaining in the injector solenoid. The result was that the response time of the next injector upon application of the injector-opening signal was comparatively long, chiefly if the movable parts of the injector were comparatively heavy as is the case in diesel engines. On the other hand, a small reciprocation of the injector needle could also occur at the beginning of the next injection period so that the injector could then be partly or completely closed again, which would unfavorably affect the accuracy of the conditions of injection. Such a reciprocation is ascribable to the fact that at the beginning of the injection period the force exerted by the solenoid in the injector-opening direction was not sufficiently larger than the spring force tending to return the needle onto its seat and the force associated with the pressure of the liquid fuel which has a tendency to close the injector.

In order to perfect the injection system, it appeared to be advantageous to use injectors in which the needle-returning spring operates in accordance with a very flat characteristic curve with reference to the stroke executed by the needle, to reduce as much as possible the variations in the needle-returning force, taking into account the allowances in execution of the injections. With such injectors the force closing the injector needle is much larger than the attracting force exerted by the solenoid if a very high returning stress is to be obtained at the end of the stroke of the needle in order to produce a rapid closing of the injector at the end of the injection period.

The present invention has as an object to cut out the elimination of these drawbacks and it embodies for this purpose a control arrangement ensuring rapid energization of the electromagnets. To this end the invention provides at least one induction coil in the circuit controlling the electromagnets which induction coil receives energizing signals periodically and at the same frequency as the solenoid of the electromagnet. Selective control means are provided so that, when the energizing signal is cut off, the magnetic energy produced in the induction coil is transferred directly or indirectly to the solenoid of the electromagnet which is to be energized in conformity with the desired sequence of injections.

A further feature of our invention is an oscillating circuit constituted by the induction coil and the solenoids of the electromagnets associated with one or more condensers, said induction coil and associated solenoids being fed simultaneously with the energization-maintaining current. Selective control means are designed in a manner such that the totality of the magnetic energy available in said induction coil and in the solenoids is stored in the condenser when the maintenance current is cut off, said energy only being discharged through the solenoids in the sequence required for their energization.

Furthermore the solenoids of the electromagnets may be associated with a condenser of a predetermined capacity and the induction coil associated with a further condenser of a predetermined capacity so as to form a number of independent oscillating circuits adapted to store the magnetic energy in the corresponding condensers at the moment at which the current is cut off. Selective control means act on the said oscillating circuits to feed the induction coil with a maintenance current of a constant duration. The condenser associated with the solenoid is discharged through the induction coil and conversely, the condenser associated with the induction coil is discharged through the solenoid in conformity with the desired sequence of energization.

According to an alternate embodiment of the invention, the arrangement includes an induction coil associated with a condenser so as to form therewith an oscillating circuit adapted to store the magnetic energy of the induction coil in the corresponding condenser at the moment at which the feed current of a constant duration is cut off. The selective control means then causes the condenser to discharge into the next solenoid in the desired sequence of energization.

In a modification, the solenoids of the corresponding electromagnets and the induction coil are associated with one or more condensers by selective control means which ensures that maintenance current having a variable duration passes through the solenoids while an induction coil is fed by a maintenance current of a constant duration. The condensers are discharged alternately into a solenoid or into an induction coil, each solenoid energization signal of variable duration being followed by a signal of a predetermined duration adapted to energize an induction coil.

According to a further embodiment of the present invention each solenoid may be connected in series with a thyristor, the control electrode of which is subjected to a pulse at the beginning of each energizing signal. Each solenoid is connected with a common supply of current through a thyristor, an induction coil and a first diode and is grounded through a controlling transistor which becomes conductive simultaneously with each thyristor upon application of a rectangular signal to its base. A condenser in series with a second diode is connected in parallel with the circuit including the solenoid, its thyristors, the induction coil and the first diode. A further thyristor, connected between the point connecting the condenser with the second diode and the point connecting said induction coil with the common connection for the first thyristors, is triggered simultaneously with the other thyristors and the controlling transistor.

According to still another embodiment of the invention, each solenoid may be connected in series with its controlling thyristor, the control electrode of which receives a pulse defining the beginning of the energization signal. Each solenoid is further connected with a common supply of current through its thyristor and a first diode and is grounded through a controlling transistor which becomes conductive together with each of said thyristors upon application of a rectangular signal to the base of said transistor. A condenser in series with a second diode is connected in parallel with said circuit including the solenoids, the thyristors and the first diode, and the induction coil is connected between a point common to the different solenoids and a point common to said first diode and condenser. A further thyristor is connected between the point connecting the condenser with the second diode and the common point for the different controlling thyristors, said further thyristor being triggered simultaneously with the other transistors and with the controlling transistor.

According to yet another embodiment the selective controlling means may include a transistor which is saturated during a constant time period T1 by a control system known in the prior art, said transistor being connected between the voltage supply and the circuits formed by the solenoids and induction coil. Said selective controlling means further include thyristors connected in series with the corresponding solenoid and adapted to be triggered by means of a control system known in the prior art, in accordance with the desired sequence of energization at a time T2 after the beginning of the time period T1. Semi-conductor unidirectional elements are connected in the circuit such that when the current is cut off after the period T1 by the transistor, the magnetic energy of the solenoid energized at the same moment is stored in a corresponding condenser, and the energy of the induction coil is stored in a corresponding condenser until the next operative cycle begins. The condenser charged by a solenoid is discharged at the beginning of the next period T1 into the induction coil, and the condenser charged by the induction coil is discharged at the end of the period T2 into a solenoid.

Furthermore, the control transistor may be connected in series with a first unidirectional semi-conductor element, and the solenoids may be connected in series with corresponding grounded controlling thyristors. A first condenser in series with a diode is connected in parallel with the solenoids and corresponding thyristors so as to form a first oscillating circuit, and an induction coil in series with a second unidirectional semi-conductor element is connected between the controlling transistor and ground so as to form with a second condenser connected in parallel with said induction coil and across the terminals of said first unidirectional semi-conductor element a second oscillating circuit. The point joining said induction coil with the second unidirectional semi-conductor element is connected with the point joining the first condenser with a diode inserted in series with the second condenser.

The inductance of the induction coil and the capacity of the associated condenser should be larger than the corresponding inductance of a solenoid and the capacity of the corresponding condenser, respectively.

Furthermore the selective control means may include a transistor which is saturated during a predetermined period T1 by well known controlling means, said transistor being connected between the supply of voltage and the circuits including the solenoids and the induction coil. Said selective controlling means further includes a thyristor inserted in series with each solenoid, said thyristor being triggered by means of a well known control system in the sequence required for the injections and after a period T2 starting from the beginning of the period T1. Unidirectional semi-conductive elements additionally are provided, at least one of which is a Zener diode adapted, at the moment of current cutoff at the end of the period T1 by the transistor, to ensure dispersion of the magnetic energy of the solenoid energized at such a moment through said Zener diode. The energy of the induction coil or coils is transmitted to the corresponding condenser while preventing said condenser from discharging before the beginning of the next operative cycle. Said last-mentioned condenser then discharged at the end of a period T2 in said further cycle into a solenoid in accordance with the desired sequence of energization of said solenoids.

The control transistor may also be connected in series with at least one unidirectional semi-conductor element, the solenoids and their grounded controlling thyristors. The induction coil in series with the Zener diode is connected between the control transistor and ground so as to form an oscillating circuit with the condenser connected in parallel with said induction coil and across the terminals of said unidirectional semi-conductor element. A diode connects the point joining the Zener diode with the induction coil to the point connecting the unidirectional semi-conductor element with the condenser.

The unidirectional semi-conductive elements may be Zener diodes operating in one direction as an ordinary diode and in the opposite direction as voltage-limiting means.

The selective controlling means advantageously includes thyristors connected in series with the corresponding induction coil and with the solenoids as well as a thyristor connected between the energy storing condenser and the point connecting the induction coil with the solenoids. The different components fed with current by means of a power transistor, the base of which is fed with an injection controlling signal of a variable duration T7 and, after a further period T8 with a signal of a predetermined duration T The signal of duration T7 is formed by a first electronic circuit after triggering by a pulse transmitter controlled by the rotation of the internal combustion engine and is applied to the power transistor and to the thyristors controlling the injector solenoids in the desired sequence by means of a distributor. A further electronic circuit adapted to produce the signal of duration T9 is connected with the first electronic circuit through an electronic delay circuit, the signal of duration T9 being applied to the power transistor and to the thyristor controlling the induction coil.

The selective controlling means may alternatively include thyristors inserted in series with an induction coil and with the corresponding solenoids; a further thyristor connected between the energy storing condenser and the common point between said induction coils and the solenoids; and a still further thyristor inserted between said common point and a further energy-storing condenser controlled by it and connected in parallel with the first-mentioned condenser. Said components are fed with current by a power transistor, the base of which receives the injection controlling signal of a variable duration T7 and after a further period T8, a signal of a predetermined duration T9. The signal triggering T7 is produced by a first electronic circuit after triggering of the latter by electronic delay means which are themselves triggered by a pulse transmitter controlled by the rotation of the internal combustion engine. The pulse from said pulse transmitter is applied also to the last-mentioned thyristor and to a distributor so that the injector-controlling controlling solenoids each receive in the desired sequence, a preliminary injection signal of a predetermined duration T10 preceding the actual injection controlling signal T7. The last-mentioned condenser supplies the energy of said signal T10 to the injector-controlling solenoids through a connection between said last-mentioned condenser, its controlling thyristor, and the first-mentioned thyristors.

The electronic circuits defining the periods T7 and T9 may include are bistable flip-flops each including two transistors fed with triggering pulses at one input and with cutoff pulses at the base of one of the transistors through a resistance, a condenser charged by said flip-flop when it is triggered, and a program-controllable uni-junction transistor. The charging voltage is applied to the anode of said program-controllable uni-junction transistor which suddenly becomes conductive when the voltages on its anode and on its control electrode are equal, except for a predetermined coefficient of proportionality, and the condenser is consequently discharged. A further transistor is connected through its base-emitter circuit between the last-mentioned condenser and the anode of the program-controllable uni-junction transistor serving as a discharge circuit for said condenser while the collector of said transistor is connected with the above-mentioned base of said one transistor of the flip-flop so as to make it nonconductive at the moment of the triggering of the program-controllable uni-junction transistor.

The electronic delay means may be a relaxation oscillator including a program-controllable uni-junction transistor, connected between the supply of current and ground in series with resistances, and a condenser which is connected between the anode of said program-controllable uni-junction transistor and ground. The pulse starting the oscillating circuit is applied to the base of a further transistor the collector emitter circuit of which is inserted between the anode of said program-controllable uni-junction transistor and ground, the signals generated by said oscillator circuit being applied to said program-controllable uni-junction transistor.

By way of example and in order to further the understanding of the following description, reference is made to the accompanying drawings illustrating various embodiments of the invention. In said drawings.

Figure 1:
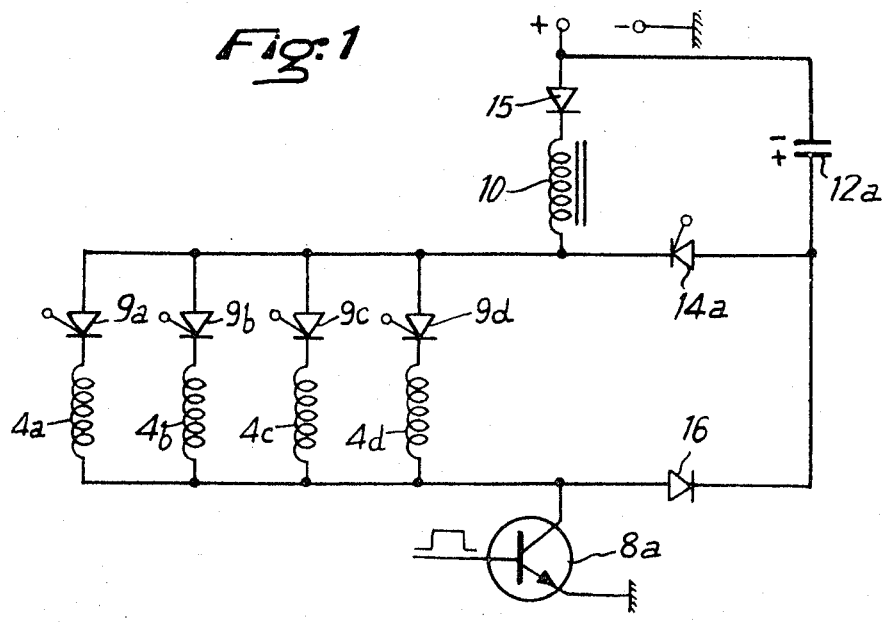
FIG. 1 is a schematic wiring diagram showing the system controlling the electromagnet solenoids in a first embodiment.
Figure 2:
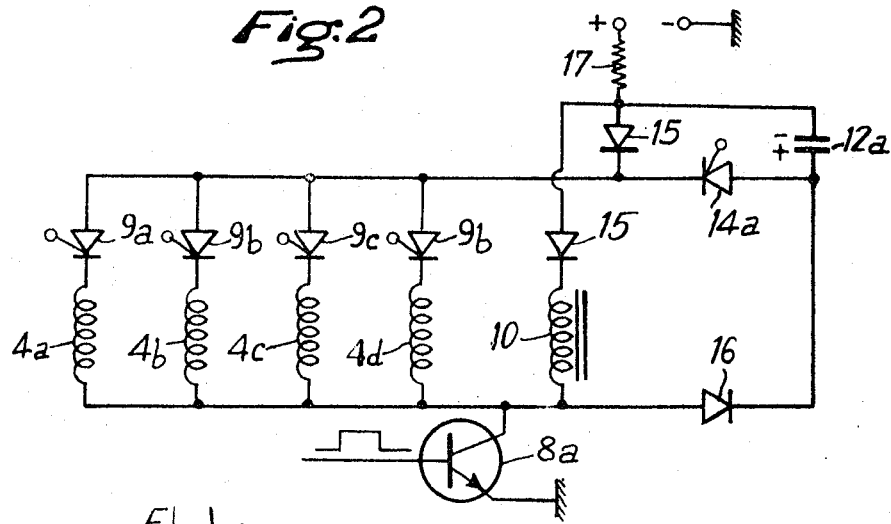
FIG. 2 is a schematic wiring diagram of a second embodiment of said controlling system.

Turning first to FIGS. 1 and 2, it is apparent that as illustrated diagrammatically, the solenoids 4a, 4b, 4c, 4d may control a relay, an electrically controlled valve or the like, a particularly interesting application being that of electromagnetically controlled injectors in an internal combustion engine as disclosed hereinafter.

In FIG. 1, the solenoids 4a, 4b, 4c, 4d are each controlled by a corresponding thyristor 9a, 9b, 9c, 9d the control electrodes of which are adapted to receive an injector activating pulse in accordance with a sequence corresponding to that of the desired injections. Said pulses are generated by a known control system which is not illustrated. The solenoids are fed in parallel by a voltage supply conventionally designated. Said solenoids are all connected in series with a common diode 15 and a common induction coil 10 fed by said voltage supply. A control transistor 8a connected between said solenoids and ground and is controlled by a rectangular signal applied to its base produced by well-known electronic means, not illustrated. The duration of said rectangular signal being a function of the operative parameters of the engine so as to define the amount of fuel to be injected for each injection. A condenser 12a is connected in parallel with the circuit including the diode 15, the induction coil 10 and the solenoids 4a–4d while a further thyristor 14a is connected between a terminal of the induction coil 10 and a point between the condenser 12a and the cathode of diode 16.

The operation of said circuit is as follows:

Assuming the apparatus is deactivated and the condenser 12a is not charged, a rectangular signal is applied to the base of the transistor 8a and simultaneously a pulse is fed to one of the thyristors 9a, 9b, 9c, or 9d and also to the auxiliary thyristor 14a. Current flows then through the corresponding solenoid 4a, 4b, 4c, or 4d and through the induction coil 10. If the current is now cut off at the end of the rectangular signal by cutting off transistor 8a, the magnetic energy stored in the energized solenoid 4a, 4b, 4c, or 4d and in the induction coil 10 has a tendency to maintain the current flowing through said solenoid and induction coil. This results in condenser 12a becoming charged with the polarity shown. Since an oscillatory circuit is formed by the energized solenoid, the induction coil and the condenser 12a, the current would have a tendency to reverse after one-quarter of its period so as to start an oscillation in the opposite direction; but this current reversal is prevented by the presence of the diode 16 and the thyristor corresponding to the energized solenoid. The condenser 12a remains charged with the same polarity until the next rectangular signal is applied to the transistor 8a together with pulses on the electrode controlling the next thyristor 9 to be energized and the thyristor 14a. At such time condenser 12a is discharged suddenly through thyristor 14a, the energized thyristor 9 and associated solenoid 4, the transistor 8a and the supply of voltage. The maintenance current is reestablished after condenser 12a discharges and passes through the diode 15, the induction coil 10, the energized transistor 9 and corresponding solenoid 4 and the transistor 8a.

According to a different embodiment illustrated in FIG. 2, the induction coil 10 with diode 15a in series therewith is connected in parallel with the series combination of diode 15, and the circuit constituted by one of the thyristors 9 and its associated solenoid 4. The thyristor 14a is connected in the same manner as in the case of FIG. 1.

Figure 3:
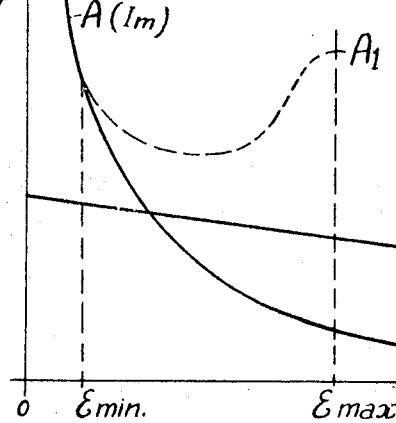
FIG. 3 is a graph illustrating the forces exerted by an electromagnet and varying with the magnitude of the gap.

In order to limit the intensity of the current flowing through said circuit a resistance 17 may be inserted in series therein. The operation is the same as in the above described embodiment, but in order to prevent the condenser 12a from discharging into the energized solenoid 4 and into the induction coil 10, diode 15a is connected in series with the latter and is also connected to the point between resistance 17 and diode 15. Thus, current is established in the energized solenoid 4 as soon as the corresponding thyristor 9 has received the triggering pulse and the transistor 8a has received simultaneously the above-mentioned rectangular signal. When transistor 8a becomes deenergized, upon termination of the rectangular pulse, the magnetic energy stored in the particular solenoid 4 which was energized and the induction coil 10 has a tendency to maintain the current flowing through them so that the condenser 12a is charged with the polarity shown. At this moment, the energy remains stored within the condenser 12 since the diode 16 and thyristor 14a, which is nonconducting prevent any reversal of current. Upon starting the following injection, a pulse is applied to thyristor 14a and to one of the thyristors 9 while a rectangular signal is applied to transistor 8a, and condenser 12a is discharged through said thyristor 14a, the energized thyristor 9, the corresponding solenoid 4, the transistor 8a, the voltage supply and the resistance 17. When the condenser 12a has been discharged, the maintenance current flows through said solenoid 4 and the induction coil 10. It is thus apparent that in both cases described (FIG. 1 and FIG. 2) the magnetic energy produced in the induction coil 10 and in the energized solenoid 4 is stored in the condenser 12a the discharge of which is effected only through a solenoid 4. Consequently, a considerable amount of energy is available for controlling the operation of the injector whereby it is possible to obtain an extremely fast response time. Considering for instance the chart of FIG. 3 illustrating the magnetic and returning forces exerted on the movable armature of an electromagnet adapted to control an injector and assuming that on said chart the straight line B corresponds to the returning force F produced by the injector spring and which is a function of the stroke executed by the injector needle, it is apparent that the slope of said straight line is very small. The closing of the injector corresponds to a maximum gap E max and E min corresponds to the complete opening of the injector. On the other hand, the curve A($m$) defining the magnetic attraction which is a function of the size of the gap shows that upon closing of the injector (that is, for a maximum gap $\Sigma$ max) the attraction provided by the maintenance current $Im$ is not sufficient to raise the needle off its seat although it is sufficient to hold the injector open as soon as the gap has actually returned to its minimum value $\Sigma$ min. Now, since the condenser 12a is discharged chiefly through the thyristor 14a, the attracting force of the electromagnet is given by the curve A1 and it is thus sufficient for a speedy opening of the injector. It should be remarked that it is not necessary for said thyristor 14a to be triggered at the same time as the thyristor 9 to be energized together with the transistor 8a. As a matter of fact, said thyristor 14a may be triggered later than the other thyristors and the transistor since the injectors cannot open until the discharge of the condenser 12a is applied to them.

Although the arrangement described provides a very favorable energy balance and the results obtained with it are excellent, certain drawbacks have appeared during the tests made. The curve of the current in the solenoids in relation with time, starting with injector opening, includes a fraction of a sinusoid representing the discharge current of condenser 12a and having a period is:

$$T = 2\pi \sqrt{L1\ C12}$$

followed by a straight line representing the maintenance current and finally by one-quarter of a sinusoid corresponding to the closing of the injectors and the duration of which is:

$$t = \pi/2 \sqrt{(L1 + L10)C12}$$

In said equations:
- $T$ is the period of a complete oscillation
- $t$ corresponds to one-quarter of a period
- $L1$ is the inductance of each solenoid 4
- $L10$ is the inductance of the induction coil 10
- $C12$ is the capacity of the condenser 12a Said formulae show that the duration of the fraction of the sinusoid corresponding to the opening is shorter than that of the closing fraction, assuming that the opening fraction is not much longer than a quarter cycle. For optimum operation of electromagnetic injectors, however, it is preferable to produce a longer opening pulse and a shorter closing pulse to achieve well defined and complete closing of the injectors.

It should also be noted that the induction coil 10 of FIGS. 1 and 2 receives no high voltage pulse for the rapid establishment of the current and that the current is actually established therein only after the condenser 12a is discharged and this only during the injection period. Consequently, the magnetic energy stored in the induction coil 10 varies with the duration of the injection, which may range between zero and a maximum value corresponding to the full load of the engine. It is thus apparent that, for reduced durations of injections, the energy available for opening the injectors is also reduced. Preferably, however, the opening energy should be constant and independent of the duration of injection.

Figure 4:
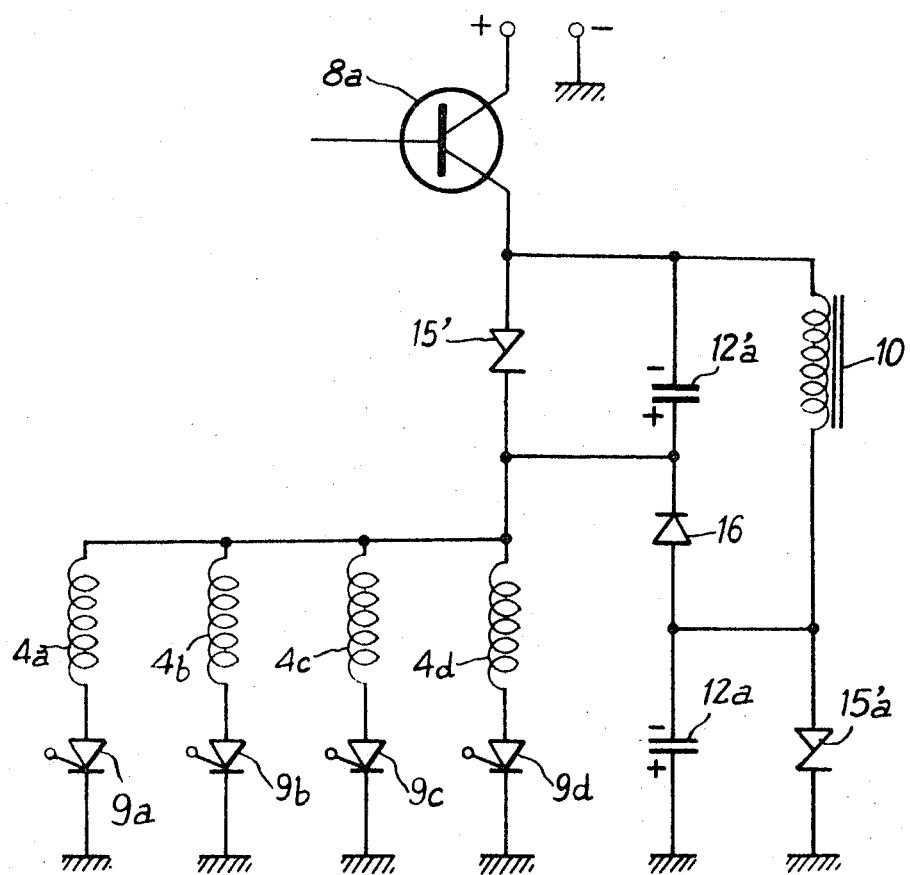
FIG. 4 illustrates a third embodiment of the control system.
Figure 6:
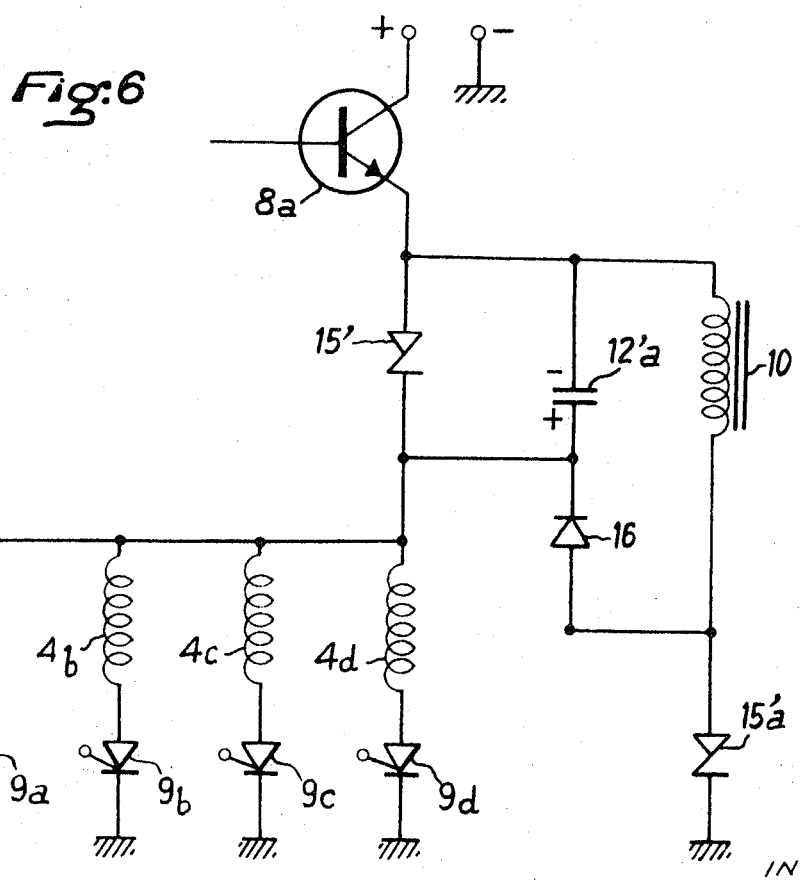
FIG. 6 is a schematic wiring diagram of a fourth embodiment.
Figure 9:
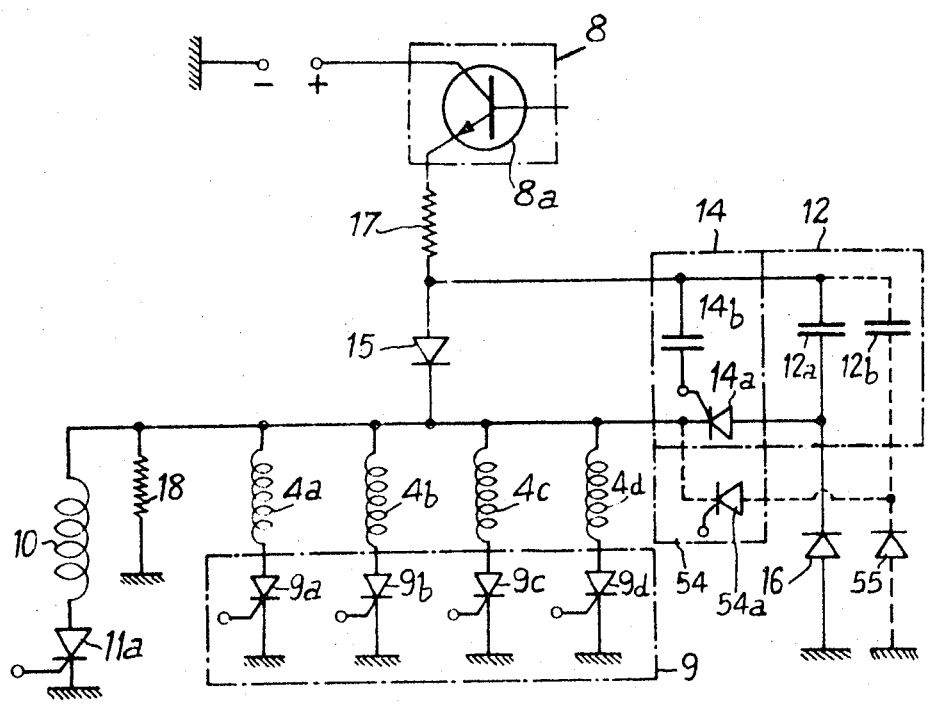
FIG. 9 is a schematic wiring diagram of the power control system for the injector solenoids and induction coils according to a fifth embodiment.

FIGS. 4, 6, and 9 show circuits designed so as to allow an energization of the induction coil 10 under constant duration conditions.

Turning to FIG. 4, the controlling transistor 8a is connected in series with a Zener diode 15', the solenoids 4a, 4b, 4c, and 4d and the associated controlling thyristors 9a, 9b, 9c and, 9d. The collector of said transistor 8a is connected with the supply of voltage while the cathodes of the thyristors 9a, 9b, 9c, 9d are grounded. The induction coil 10 is connected with the emitter of the transistor 8a and is grounded through a second Zener diode 15a'. The condenser 12a is connected between ground and the point joining Zener diode 15' with the solenoids 4 through the diode 16 while a further connection is provided between the point connecting condenser 12a with said diode 16 and the point connecting the induction coil 10 with Zener diode 15'a. The condenser 12'a associated with the induction coil 10 is inserted in parallel with the Zener diode 15'.

It should be noted that the base of transistor 8a is connected with a well known control system so that said transistor 8a is saturated each time an injection is to be executed. Similarly the control electrodes of the thyristors 9a –9d are connected with a well known control system for triggering them in the sequence desired for the injections.

The operation of the circuit shown in FIG. 4 is as follows:

Assuming the condensers 12'a, 12a' are charged with the indicated polarity at the end of the preceding energization, it is apparent that, as soon as the transistor 8a becomes conductive, condenser 12a is discharged through the supply of voltage, transistor 8a and the induction coil 10. A maintenance current flows through induction coil 10 and Zener diode 15a' as soon as condenser 12a is sufficiently discharged for it no longer to bias said Zener diode 15'a. The transistor 8a remains saturated, during a predetermined period T1. If, after a period T2, one of the thyristors 9 is now triggered, the condenser 12'a is discharged suddenly through the solenoid 4, the corresponding energized thyristor 9, the supply of voltage and the transistor 8a. The maintenance current through the solenoid 4 is then established as soon as the voltage across the condenser 12'a has dropped sufficiently so as to no longer bias the Zener diode 15'. This means that the solenoid 4 is energized after a period T2 has elapsed after saturation of the transistor 8a, the period T2 being adjustable between zero and a value equal to T1 so that the duration of energization may correspond to the difference T1–T2 and may vary consequently between zero for T2=T1 and T1 for T2=0.

When after the period T1 has elapsed, the transistor 8a is again nonconductive, the current flowing through induction coil 10 and one of the injector solenoids 4 is maintained and charges during one-quarter of the oscillation period, condensers 12'a and condenser 12a. Since the Zener diodes 15' and, 15'a are connected in parallel respectively with corresponding condensers 12'a and, 12a, said diodes limit the charging voltage for said condensers 12'a and 12a to a value corresponding to the threshold voltage of said Zener diodes 15' and 15'a. Furthermore the Zener diodes are excellent safety means for the case where a condenser becomes defective or a wire breaks, since the voltages which may then appear can never rise beyond the threshold voltage of said Zener diodes 15' and 15'a. Obviously, said Zener diodes 15' and 15'a may be replaced by ordinary diodes without departing from the scope of the invention.

The durations of the charging and discharging of the condensers are expressed by the following formulae $$T3 = \pi/2 \sqrt{L1\ C12a}$$
$$T4 = \pi/2 \sqrt{L10\ C12'a\ a}$$

wherein T3 and T4 correspond to one-quarter of a period of the oscillation of the oscillating circuits constituted respectively by one of the solenoids 4 with its condenser 12a and by the induction coil 10 with its condenser 12'a, L1 is the inductance of each of the solenoids, C12a is the capacity of condenser C12a, L10 the inductance of the induction coil 10 and C12'a is the capacity of the condenser 12'a.

The charging of the condensers lasts exactly one-quarter of a period of oscillation since the diode 16 prevents any reversal of the current.

In contradistinction, the durations T5 and T6 of the discharge of C12'a and C12a expressed by the formulae:

$$T5 < \pi \sqrt{L1\ C12'a}$$
$$T6 < \pi \sqrt{L10\ C12'a}$$

Figure 5:
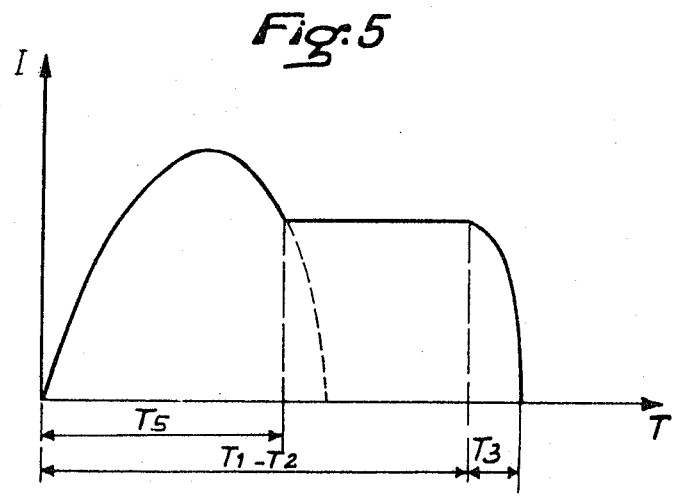
FIG. 5 is a graph of a curve defining the current intensity in the solenoid with reference to time.

Currents start flowing as soon as said condensers 12'a and 12a are sufficiently discharged and can no longer bias the Zener diodes 15' and 15'a. The curve defining the intensity of the current in the injector solenoids as a function of time is illustrated by the graph of FIG. 5. The inductance of the induction coil 10 and the capacity of the condensers 12a and 12'a being selected in a suitable manner, it is possible to obtain any desired ratio between T3, T4, T5 and, T6. As already mentioned, it is particularly desirable to obtain a duration of the injector opening pulse corresponding to the discharge time T5, which is long and the potential energy of which is constant and independent of the duration T1–T2 in the case where the duration T1 for the energization of the induction coil 10 is constant and the capacity C12'a is large with reference to the other capacity C12'a. In contradistinction, if it is desired to obtain a short duration T3 in order to more rapidly close the injectors it is necessary to select a small capacity C12'a.

With the circuit of FIG. 4 it is also possible to obtain pulse durations which are shorter than T5+T3. Even if the condenser 12'a is not yet completely discharged through the energized solenoid 4, as soon as transistor 8a becomes nonconductive a voltage immediately appears between diode 16 and condenser 12'a, as generating by the collapsing field of induction coil 10. That opposes continued discharge of said condenser 12'a and charges it again up to its starting level.

It should also be noted that the circuit illustrated in FIG. 4 is not limited to the case where the induction coil 10 is always fed for a period of constant duration T1 while a solenoid 4 starts being energized after a duration T2 has elapsed after the start of T1. In such a case the end of the energization is predetermined, whereas beginning of the energization may vary. If, on the other hand, it is desired to begin the energization at a predetermined time while the end of said energization is variable, it is necessary to simultaneously trigger transistor 8a and one of the thyristors 9 and to keep said transistor saturated during a period which varies with the desired duration of energization. As before, condenser 12'a, the charging of which is associated with the induction coil 10, discharges into the energized solenoid 4 while condenser 12a, the charging of which is associated with the injection solenoids 4, discharges into the induction coil 10, but the potential energy in the condenser 12'a is no longer constant in this case.

The circuit illustrated in FIG. 4 may be simplified by eliminating condenser 12a, as illustrated in FIG. 6. In such a case, induction coil 10 obviously receives no high speed energizing pulse, the condenser 12a no longer being available for storing the magnetic energy produced by the solenoids 4. The magnetic energy of the solenoids 4 is then dissipated in the solenoids when transistor 8a becomes nonconductive the current returns only through the loop constituted by the Zener diode 15'a and diode 16. In this case the current flowing in the solenoid 4 decays according to a linear law it follows a sinusoidal law in the case of FIG. 4.

It should be noted that the circuits described with reference to FIGS. 4 and 6 are not useful in all applications as applied to the control of fuel injection through electromagnetic injectors. Although the arrangement of FIGS. 4 and 6 permits full use of the time separating two successive injections at the maximum rate of the engine to provide a maximum duration T1 for energizing induction coil 10 there is a disadvantage in that the beginning of the injection varies with the load whereas the end of the injection is fixed. Now, particularly in the case of diesel engines, the beginning of the injection should have a fixed relationship with respect to the angular position of the crankshaft. In diesel engines, the time separating successive injections is comparatively long because the duration of the injections is short, for example, 2 milliseconds under full load, while the maximum speed of rotation is comparatively low.

To eliminate this disadvantage and to provide a concrete example of the application of the invention to diesel engines, FIGS. 7 to 11 illustrate a system for electronically controlling the injection of fuel into diesel engines.

Referring to FIGS. 7 to 11 an engine 1 is provided with an input manifold 51 and with injectors 4 which are fed with fuel subjected to a constant pressure by a pump 50 sucking the fuel out of the container 46 and urging it forwardly through the filter 49. A hydraulic pressure accumulator 47 is also provided together with a pressure-regulating valve 48. A pulse generator 2 driven by the engine sends triggering pulses into a first electronic circuit 5 adapted to define the duration of injection T7, said pulses passing through delay means 13 controlled by the rotary speed of the engine. Said electronic circuit 5 is provided with a number of inputs for adjusting the duration of injection in accordance with the operative parameters of the engine. A rectangular signal of duration T7 provided by circuit 5 is transmitted to the power means 8 controlling the injectors 4. Circuit 5 also provides pulses coinciding with the end of each rectangular signal of duration T7 for triggering an electronic delay circuit 6 which then transmits a pulse delayed by a time T8 to an electronic circuit 7. Said electronic circuit 7 produces a rectangular signal of a constant duration T9 which is also transmitted to the power means 8 controlling the injectors 4 and in addition to a means 11 controlling an induction coil 10. An energy storage system 12 is connected with the induction coil 10 and with injection solenoids 4, the energy being restored to the induction coil and to the injector solenoids 4 through a control means 14 by way of control means 11 and a control circuit 9, respectively. The control circuit 9 is connected with the pulse generator 2 controlling the injectors, and it receives the distributed signals in a sequence corresponding to the injections to be executed. This sequence is effected by a distributor 3 controlled by the rotation of the engine and receiving a pulse from the circuit 5 each time an injection is to be performed. The electronic circuit system is fed with current from a battery 56 through a switch 52.

Figure 7:
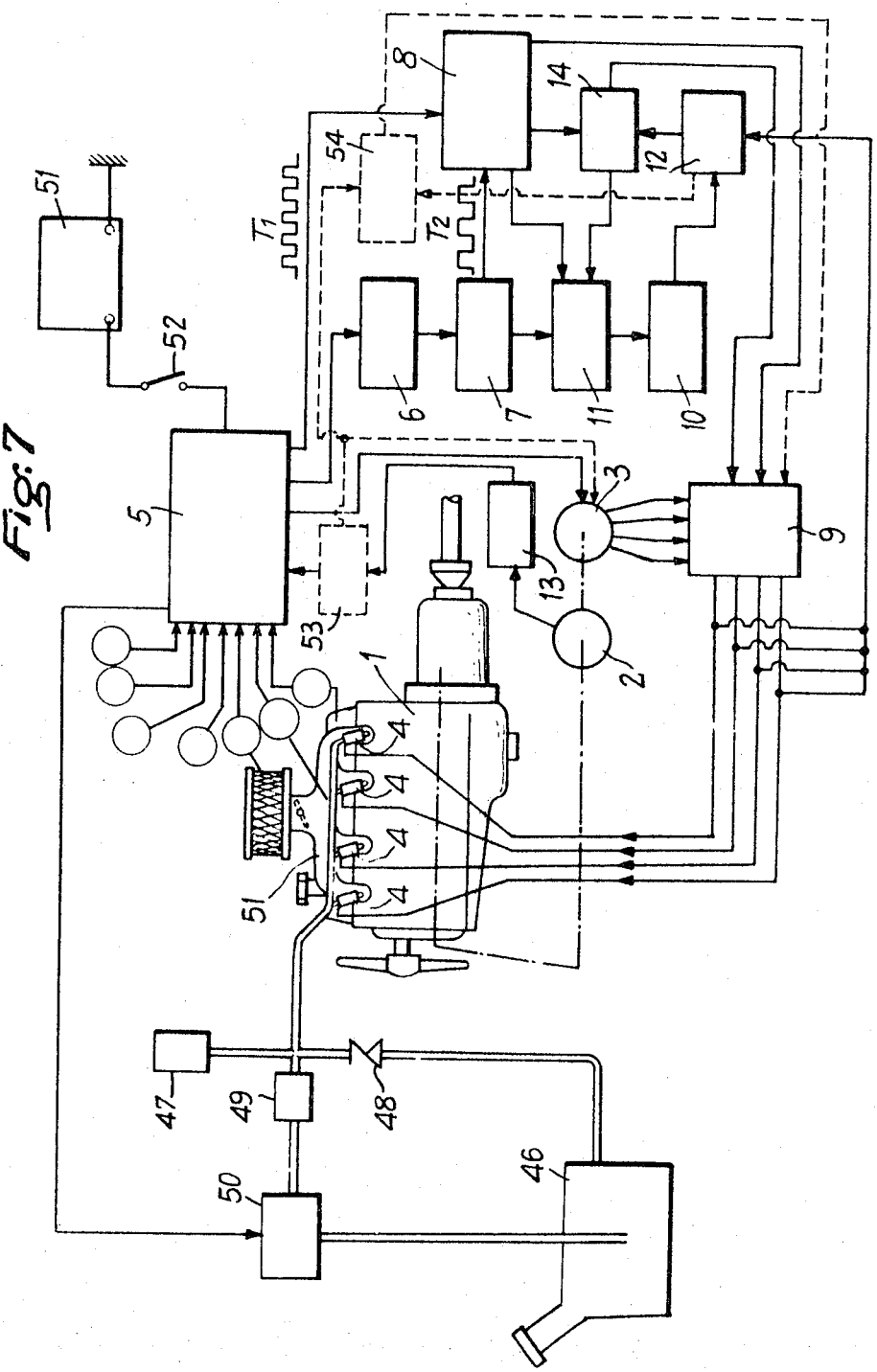
FIG. 7 is a schematic diagram of the complete arrangement controlling the electromagnetic injectors in an internal combustion engine according to the present invention.
Figure 8:
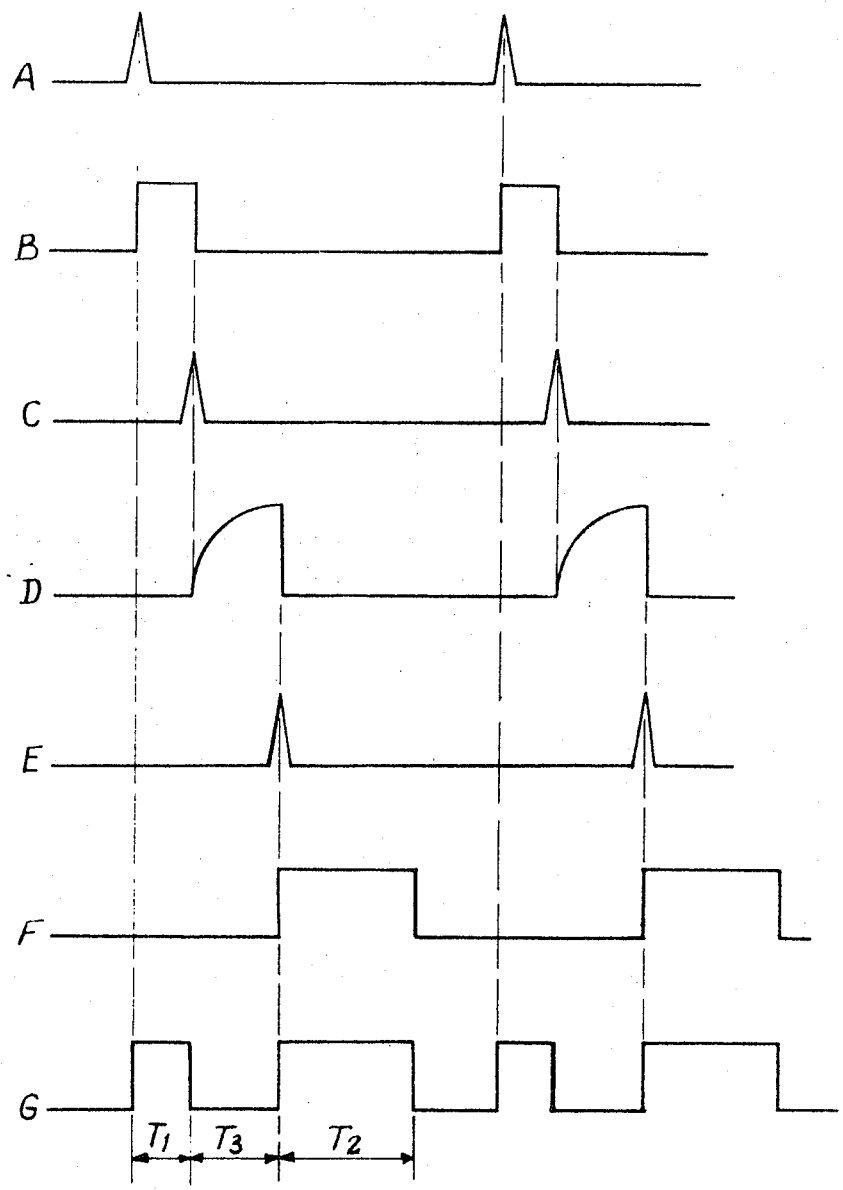
FIG. 8 is a chart showing the shape of the electric signals adapted to actuate the various components of the control system of FIG. 7.

The chart of FIG. 8 shows the waveshape and time relation of the various signals in the system of FIG. 7. Pulses A from the pulse generator 2 trigger circuit 5, causing it to generate rectangular signals B of a variable duration T7 defining the duration of injection, said signals being then transmitted to the power means 8 controlling the injectors. The end of each pulse B is transformed into a signal C which is applied to delay circuit 6 which produces signals D of a duration T8. The trailing edge of signal D is transformed into pulse E and is applied to the circuit 7. Said circuit 7 produces rectangular signals F of duration T9 transmitted to the power means 8 controlling the injectors. Power means 8 combines signals B and E to produce a series of rectangular signals G applied to the control circuit 9 and control means 11 and 14. Circuit 9 distributes the signals T7 to the injectors 4 in a sequence corresponding to the desired injection sequence as governed by the distributed pulses produced by the distributor 3, which is triggered by the circuit 5. Circuit 11 on the other hand transmits to the induction coil 10 only signals of a constant duration T2. The magnetic energy of the induction coil 10 and of the injectors 4, which is stored in energy storage system 12, is released by control means 14 in response to a signal G from power means 8. The distribution of said energy into induction coil 10 and the injectors 4 is ensured by control circuit 9 and control means 11 at the beginning of the corresponding rectangular control signals T7 and T9.

Referring now to FIG. 9 it can be seen that power means 8 is a transistor 8a connected between the voltage supply and a common junction of induction coil 10 and injector solenoids 4 through resistance 17 and diode 15. The base of said transistor 8a receives of rectangular signals the duration T7 and T9. The control circuit 9 comprises thyristors 9a, 9b, 9c and 9d connected in series with the corresponding injector solenoids 4a, 4b, 4c, 4d, and control means 11 comprises auxiliary thyristor 11a connected in series with the induction coil 10. The electrodes controlling the thyristors 9 are connected with the distributor 3 whereas the electrode controlling the thyristor 11a is connected with the output of electronic circuit 7. The energy storage means 12 is a condenser 12a connected in parallel with diode 15. Said condenser 12a is charged through diode 16 each time transistor 8a conducts.

The control circuit 14 is constituted by thyristor 14a connected between the junction of condenser 12a with the diode 16 and the common junction of induction coil 10 and solenoids 4. Said control circuit is energized by the beginning of each rectangular pulse of waveform G, a connection being provided between the electrode controlling said thyristor 14a and either the base of the transistor 8a (connection not illustrated) or the emitter of the latter through resistance 17 and condenser 14b. A resistance 18 connects the cathode of the thyristor 14a to ground to bias it even if all the thyristors 9a, 9b, 9c, 9d and 11a are nonconductive.

The operation is as follows:

Each time transistor 8a is rendered conductive by a signal 3 of duration T7, thyristor 14a becomes conductive as does one of the thyristors 9 (by reason of a triggering pulse from distributor 3) so that condenser 12a is discharged into the corresponding solenoid 4. After condenser 12a has been sufficiently discharged for it to no longer bias diode 15 in the reverse direction, the maintenance current is established through transistor 8a for the remainder of period T7 whereas thyristor 14a is cut off. When transistor 8a becomes nonconductive at the end of said signal B, the magnetic energy in the solenoid of the energized injector is transformed into a charging current for condenser 12a through diode 16 during one-quarter of the period of oscillation of the oscillating circuit constituted by the energized solenoid 4 and condenser 12a. The oscillation stops after one-quarter of a period since the current cannot reverse because of the plurality of diodes 16 and 15 and the corresponding thyristor 9, which is cut off at that time. When signal F of duration T9 appears after a period of time T8 following each signal of duration T7, thyristors 11a and 14a are triggered and condenser 12a is discharged into induction coil 10. At the end of signal F of duration T9, condenser 12a is charged by induction coil 10 but at a voltage which is higher than that provided by solenoid 4 since the value of the inductance of induction coil 10 is selected so as to provide a high level of energy.

It is thus apparent that condenser 12a is charged once by the magnetic energy of the injectors which energy is then discharged into induction coil 10 and it is thereafter charged again by the magnetic energy of induction coil 10, which energy is subsequently discharged into the injector solenoids. There is thus obtained a constant opening energy for the injectors, since it is provided by the induction coil fed by a signal of a predetermined duration T9. By way of example it may be considered that the minimum duration between two successive injections is equal to 5.5 milliseconds while the duration of the injection T7 may range between 0 and 2 milliseconds. If a time T8 is provided between the signals T7 and T9 which is equal to 0.5 milliseconds, the duration T9 may be equal to 3 milliseconds, which is ample for the current to be completely established in the induction coil 10. Of course, it is possible to provide a plurality of induction coils 10 and a plurality of condensers 12a, the injection then being subdivided into several groups each of which is controlled separately. Such an arrangement is contemplated by this invention.

Figure 10:
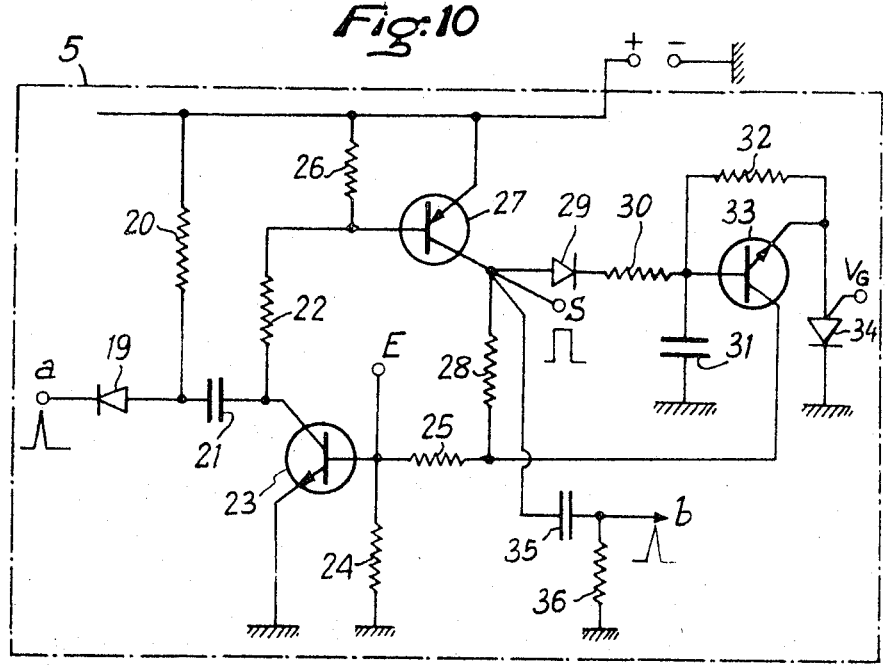
FIG. 10 illustrates the circuit adapted to define the duration of injection
Figure 11:
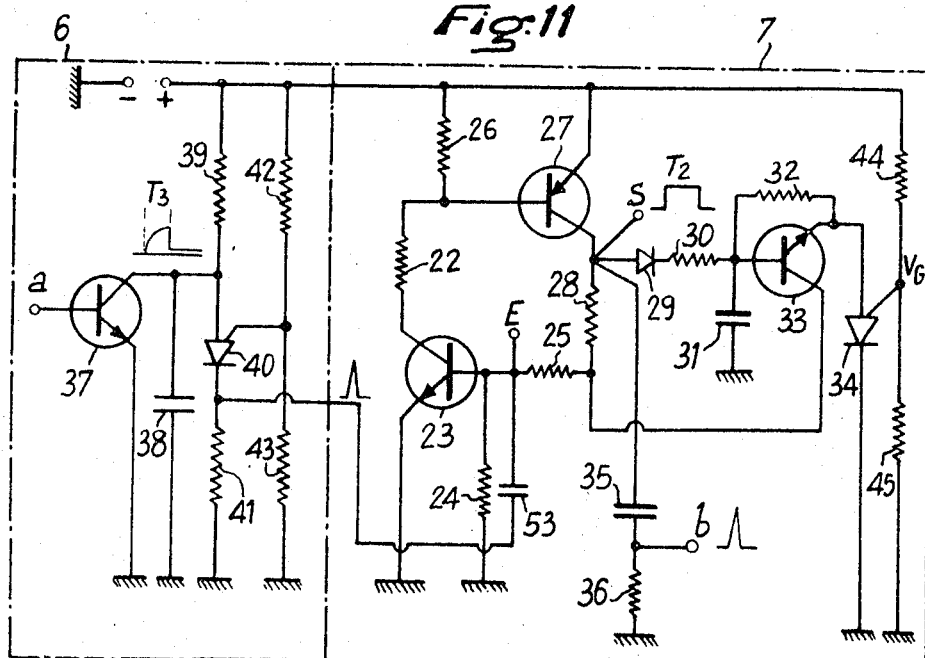
FIG. 11 illustrates the circuit adapted to define the delay and also the duration of energization of the auxiliary induction coil.

The electronic circuits 5 and 7 (FIG. 7) for producing the signals B and F are set forth in FIGS. 10 and 11 respectively. These circuits are substantially identical and each includes a bistable flip-flop constituted by two transistors 23 and 27. The collectors of transistor 23 is supplied by a voltage $V_A$ through resistances 22 and 26 while its emitter is grounded. The second transistor 27 is connected through its emitter with the voltage supply and through its collector with the base of transistor 23 through resistances 28 and 25, a resistance 24 grounding the base of transistor 23. The base of transistor 27 is connected with the point joining resistances 22 and 26. The collector of transistor 27 is also connected with condenser 31 through diode 29 and resistance 30. The program-controllable uni-junction transistor 34 is grounded through its cathode while its control electrode has applied to it a voltage $V_G$ which varies as a function of the operative parameters of the engine such as rotary speed and load. The anode of thyristor 34 is connected through resistance 32 with the point connecting condenser 31 with resistance 30. Further, the collector of transistor 33 is connected with the point joining resistances 25 and 28 while its emitter is connected with the anode of the program-controllable single-junction transistor 34, and its base is connected with the point joining resistances 30 and 32.

The operation of said circuit is as follows:

When a positive pulse is applied at E, transistor 23 becomes conductive and consequently the voltage on the base of transistor 27 is lowered so that transistor 27 becomes conductive. Thus, the voltage at point E and consequently that on the base of transistor 23 is of a value to cause transistor 23 as well as transistor 27 to remain conductive. At the moment when transistor 27 becomes conductive, point S is practically at the voltage $V_A$ and condenser 31 is charged through diode 29 and resistance 30. Diode 29 eliminates variations in the charging time of condenser 31 due to modifications in the operating frequency so that the time when condenser 31 discharges is stabilized. Diode 29 may be replaced by a diode operating under constant current conditions or the like equivalent means such as a transistor adapted to act as a constant current generator.

The anode of the nonconductive thyristor 34 is always at the same voltage as condenser 31 by reason of the connection provided by the resistance 32. However, at the moment when said voltage is equal to the voltage $V_G$ applied to the control electrode of thyristor 34 (except for a difference $\Sigma$), thyristor 34 suddenly becomes conductive and discharges condenser 31 through the base-emitter circuit of transistor 33 which is then also conductive. Consequently condenser 31 is discharged rapidly through the base emitter circuit of said transistor, and the point connecting the resistances 25 and 28 is returned to a very low voltage substantially equal to that of the emitter of transistor 33, so that transistor 23 becomes nonconducting and the flip-flop returns to its off condition.

In FIG. 10, the input E is adapted to receive the triggering signal a from pulse generator 2. The output S serves for the transmission of the rectangular signals B of duration T7 to the base of transistor 8a and to the distributor 3 at b in the form of sharp pulses provided by condenser 35, which is discharged through the resistance 36. The connection with delay circuit 6 (FIG. 7) is obtained through the collector of transistor 23 across condenser 21 and through diode 19 at a each time transistor 23 is cut off, the resistance 20 ensuring the discharge of said condenser 21 after the passage of the pulse.

Turning to FIG. 11, the delay circuit 6 includes a relaxation oscillator including a program-controllable uni-junction transistor 40 connected between the voltage supply and ground in series with resistances 39 and 41. A condenser 38 is connected between the anode of said program-controllable uni-junction transistor and ground. The electrode controlling said transistor 40 is held at a predetermined voltage by the voltage divider comprising the two resistances 42 and 33, connected between the voltage supply and ground. The collector emitter circuit of transistor 37 is connected between the anode of said transistor 40 and ground whereas its base is connected at a with electronic circuit 5 (FIG. 10). Thus each time a pulse c produced by the circuit 5 is applied to the transistor 37, the voltage on the anode of the transistor 40 is returned to a very low value so that it becomes non-conductive, Since transistor 37 becomes non-conductive after the termination of the pulse, condenser 38 is charged during a period of time T3 through the resistance 39. At the moment at which the charging voltage reaches that of the control electrode (except for a predetermined coefficient of proportionality) transistor 40 suddenly becomes conductive. Condenser 38 discharges, which produces a pulse at the input E of the electronic circuit 7 through condenser 53. Circuit 7 is thus triggered. The output S of circuit 7 transmits a rectangular signal F of a constant duration T9 to the base of transistor 8a. The signal at b in circuit 7 generated by the discharge of condenser 35 through resistance 36 is applied to the electrode controlling the thyristor 11a associated with the induction coil 10 in FIG. 9. The duration T9 is determined by the voltage divider comprising resistances 44 and 45.

In certain cases and in particular in the case of diesel engines, it may be of interest to provide before the injection signal of duration T7, a pre-injection signal of duration T10 in order to improve the conditions for ignition and combustion. In such a case the pulses produced by the pulse generator 2 are transmitted to a further delay circuit 53 illustrated in dashed lines in FIG. 7 and which is similar to delay circuit 6 described above. Said circuit 53 transmits pulses with no delay to distributor 3 and to a control means 54 cooperating with the energy storage means 12 so as to transmit a fraction of said energy to the control circuit 9 and thence into the injector solenoids in a sequence corresponding to the desired sequence of injections. Further circuit 53 transmits pulses to circuit 5 with a predetermined delay and from there to the successive portions of the system as discussed above.

FIG. 9 illustrates in dashed lines the connections provided for this purpose, through the diodes 16 and 55. Each condenser is discharged separately when required, by means of control thyristors 14 and 54a. Thyristor 14a is triggered by each signal B of duration T7 while thyristor 54a by the delay circuit 53 (FIG. 7) at a time T11 before thyristor 14a is triggered. Consequently, each injector receives two opening pulses, the first of which of a short duration T10 is produced by the discharge of the condenser 12b which opens the injector for the injection of a very small amount of fuel initiating the ignition, while the second opening pulse of a longer duration T7 first discharges condenser 12a so as to open the injector at a high speed and thereafter provides a maintenance current through transistor 8a.

What I claim is:

1. In a system for rapidly energizing electromagnetic fuel injectors for internal combustion engines of the type having at least one injector, separate solenoids for actuating each injector, means for providing periodic first control signals of frequency directly related to engine speed for determining each fuel injection period, means for providing an injector activating signal during the time of each first control signal, a first condenser for storing a solenoid energizing charge, means for discharging the first condenser through each solenoid selectively in turn in response to one of the injector activating signals for rapidly energizing the selected solenoid to open its associated injector in accordance with the desired sequence of injector operation, and means for thereafter maintaining the energization of the selected solenoid in response to the first control signal for a period of variable duration depending on the time between commencement of one injector activating signal and the termination of the corresponding first control signal as determined by operating parameters of the engine, the improvement comprising:
   a. an induction coil for providing at least part of the solenoid energizing charge stored in said first condenser:
   b. means for periodically applying a voltage to said induction coil in response to second control signals of the same frequency as the first control signals and for causing a current to flow through the coil; and
   c. means for causing said first condenser to store the electromagnetic energy generated in at least said induction coil upon termination of each second control signal.

2. The system of claim 1 wherein said means for discharging the first condenser through each solenoid selectively in turn comprises:
   a. separate first thyristors in series circuit with each solenoid and controlled selectively by the injector activating signals, all of said series solenoid circuits being connected in parallel between one common junction and another common junction, and
   said means for thereafter maintaining the energization of the selected solenoid comprises:
   b. a constant voltage source and
   c. a gating device connected in series with the paralleled solenoid circuits across the voltage source for closing the circuit between said voltage source and the solenoid circuits in response to the commencement of the first control signals and for opening said circuit in response to the termination of the first control signals.

3. The system of claim 2 wherein said means for periodically applying a voltage to and for causing a current to flow through the induction coil comprises:
   a. said constant voltage source and
   b. a gating device connected in series with the induction coil across the voltage source for closing the circuit between said voltage source and the induction coil in response to the commencement of the second control signals and for opening said circuit in response to the termination of the second control signals.

4. The system of claim 3 wherein the gating device for closing and opening the circuit between the voltage source and the induction coil in response to the second control signals is the same as the gating device for closing and opening the circuit between the voltage source and the induction coil in response to the first control signals.

5. The system of claim 4 wherein said first condenser is arranged in series with the paralleled solenoid circuits and the gating device across said voltage source, whereby the voltage of said first condenser, when charged, adds to the voltage of said voltage source for rapidly energizing the selected solenoid in response to an injector activating signal.

6. The system of claim 5 wherein the first control signal and the second control signal coincide, and said induction coil is in series with the paralleled solenoid circuits and the gating device across said voltage source.

7. The system of claim 6 wherein the first control signals are of variable duration corresponding to the desired time of injector activation, and the commencement of each injector activation signal coincides with the commencement of each first control signal.

8. The system of claim 6 wherein said induction coil is in parallel with the first condenser, and the means for discharging the first condenser further comprises:
   a. a switching device between the first condenser and said one common junction of the solenoid circuits for connecting the first condenser to said one common junction in response to each injector activating signal and for disconnecting the first condenser from said one common junction at the termination of the first control signal, whereby the first condenser discharges through the selected solenoid upon coincident actuation of the gating device, the switching device, and a selected one of the first thyristors, and thereafter said voltage source maintains a flow of current through the induction coil and the selected solenoid for the duration of the first control signal; and
   wherein the means for causing said first condenser to store the electromagnetic energy generated in at least said induction coil comprises:
   b. a first diode connected between said other common junction of the paralleled solenoid circuits and the junction between the first condenser and the switching device for permitting transfer to the first condenser of the energy generated in the induction coil and the selected solenoid upon termination of the second control signal while preventing reverse flow of stored energy from the charged condenser except through said switching device.

9. The system of claim 8 further comprising:
   a. a second diode in series with the induction coil for permitting the flow of current through the induction coil and selected solenoid from the voltage source while preventing discharge of the first condenser through the induction coil upon actuation of the switching device.

10. The system of claim 5 wherein said induction coil is in parallel with said solenoids across the voltage source whereby current flow through the induction coil from the voltage source does not pass through said solenoids.

11. The system of claim 10 wherein the means for causing said first condenser to store the electromagnetic energy generated in at least said induction coil comprises:
   a. a first diode connected between the first induction coil and the first condenser for permitting transfer to the first condenser of the energy generated in the induction coil upon termination of the second control signal while preventing reverse flow of stored energy from the charged condenser through the first induction coil.

12. The system of claim 11 further comprising:
   a. a second diode connected in parallel with the first condenser for permitting the flow of current through the selected solenoid from the voltage source after each discharge of the first condenser while preventing short circuit discharge of the first condenser.

13. The system of claim 12 wherein said induction coil is arranged in parallel with the series circuit including the first condenser and the paralleled solenoid circuits.

14. The system of claim 13 further comprising:
   a. a second condenser connected between the junction of the induction coil with the first diode and said other common junctions of the paralleled solenoid circuits for storing the energy generated by the selected solenoid upon termination of each first control signal and for rapidly energizing the induction coil upon commencement of each second control signal and b. a third diode in parallel with the second condenser for permitting the flow of current through the induction coil from the voltage source for the duration of each second control signal while preventing short circuit discharge of the second condenser.

15. The system of claim 14 wherein the second and third diodes are zener diodes, whereby the charges on the first and second condensers are limited to the breakdown voltages of said zener diodes.

16. The system of claim 10 wherein the second control signal is of fixed duration, whereby the induction coil always generates the same energy for storage in the first condenser independent of the duration of injection.

17. The system of claim 16 wherein each second control signal occurs between successive first control signals and further comprising:
   a. a second thyristor in series with the induction coil and controlled by the second control signals for permitting current to flow through the induction coil only during each second control signal.

18. The system of claim 16 wherein the terminations of the first control signal and the second control signal coincide.

19. The system of claim 16 wherein the first and second control signals are of fixed duration not less than the longest desired time of injector activation, and the injector activation signal is initiated at a variable time after the commencement of the first control signal as determined by operating parameters of the engine, whereby the induction coil is always energized for periods of fixed duration by current from the voltage source delivered through the gating device in response to the second control signal, and the selected solenoids are energized for periods of variable duration equal to the time between the initiation of each injector activation signal and the termination of the corresponding first control signal.

20. The system of claim 12 wherein the means for discharging the first condenser further comprises:
   a. a switching device between the first condenser and said one common junction of the solenoid circuits for connecting the first condenser to said one common junction at the commencement of each injector activating signal and for disconnecting the first condenser from said one common junction at the termination of each first control signal, whereby the first condenser discharges through the selected solenoid upon coincident actuation of the gating device, the switching device, and a selected one of the first thyristors, and thereafter said voltage source maintains a flow of current through the selected solenoid for the duration of the first control signal.

21. The system of claim 20 wherein each second control signal occurs between successive first control signals and further comprises:
   a. a second thyristor in series with the induction coil and controlled by the second control signals for permitting current to flow through the induction coil only during each second control signal.

22. The system of claim 21 further comprising:
   a. a second condenser in parallel with the first condenser for storing a preliminary solenoid energizing charge;
   b. means for providing a third control signal preceeding each injector activating signal;
   c. an auxiliary switching device connecting the second condenser to said one common junction of the paralleled solenoid circuits and responsive to the third control signal for providing preliminary energization of the solenoids by discharge of the second condenser.

* * * * *

UNITED STATES PATENT OFFICE
CERTIFICATE OF CORRECTION

Patent No. 3,665,901　　　　　　　Dated　　May 30, 1972

Inventor(s)　　Louis A. Monpetit et al.

It is certified that error appears in the above-identified patent and that said Letters Patent are hereby corrected as shown below:

Column 1, line 62, delete "to cut out".
Column 4, line 6, insert -- are -- before "fed".
Column 4, line 9, after "T" insert -- 9 --.

Column 4, lines 32-33, delete " of the latter".

Column 4, line 37, delete "controlling (second occurrence).
Column 5, line 38, insert -- and -- after "9C".
Column 5, line 46, insert -- is -- after "8a".

Column 8, line 31, after "formulae" insert a colon -- : --.
Column 8, line 33, " $\sqrt{L10\ C12'a\ a}$ " should be -- $\sqrt{L10\ C12'a}$ --.
Column 9, line 22, after "nonconductive" insert -- because --.
Column 9, line 26, after "linear law" insert -- whereas --.
Column 12, line 10, "a" should be -- A --.
Column 12, line 31, "a" should be -- $\underline{a}$ -- .
Column 12, line 69, after "14" insert -- a --.
Column 12, line 70, after "54a" insert -- is triggered --.

Signed and sealed this 6th day of March 1973.

(SEAL)
Attest:

EDWARD M. FLETCHER, JR.　　　　　　ROBERT GOTTSCHALK
Attesting Officer　　　　　　　　　　Commissioner of Patents